(12) United States Patent
Shin et al.

(10) Patent No.: US 10,352,519 B2
(45) Date of Patent: Jul. 16, 2019

(54) SEQUENTIAL TURN SIGNAL USING LASER SOURCE AND METHOD FOR SEQUENTIALLY BLINKING THE SAME

(71) Applicants: Hyundai Motor Company, Seoul (KR); Kia Motors Corporation, Seoul (KR)

(72) Inventors: Jik-Soo Shin, Incheon (KR); Keon-Soo Jin, Ulsan (KR); Woo-Joo Jung, Gyeonggi-do (KR); Kyung-Ho Kim, Gyeonggi-do (KR); Sung-Uk Choi, Gyeonggi-Do (KR); Yong-Woo Park, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/836,320

(22) Filed: Dec. 8, 2017

(65) Prior Publication Data

US 2019/0078744 A1 Mar. 14, 2019

(30) Foreign Application Priority Data

Sep. 8, 2017 (KR) .......................... 10-2017-0115370

(51) Int. Cl.
*B60Q 1/38* (2006.01)
*F21S 41/16* (2018.01)
*F21S 41/20* (2018.01)

(52) U.S. Cl.
CPC ................ *F21S 41/16* (2018.01); *B60Q 1/38* (2013.01); *F21S 41/285* (2018.01)

(58) Field of Classification Search
USPC ...... 362/606, 512, 464, 510, 498; 349/60, 65
See application file for complete search history.

(56) References Cited

U.S. PATENT DOCUMENTS

| | | | |
|---|---|---|---|
| 7,704,644 B2* | 4/2010 | Schneider | B82Y 20/00 359/3 |
| 2004/0081400 A1* | 4/2004 | Iler | G02B 6/02095 385/37 |
| 2012/0134164 A1* | 5/2012 | Park | B60Q 1/143 362/464 |
| 2015/0167916 A1* | 6/2015 | Lee | F21S 41/689 362/512 |
| 2016/0258589 A1* | 9/2016 | Ahn | F21S 41/16 |
| 2016/0341391 A1* | 11/2016 | Yamamoto | B60Q 1/1438 |
| 2017/0210282 A1* | 7/2017 | Rodriguez Barros | G03B 21/00 |
| 2018/0180733 A1* | 6/2018 | Smits | G01S 17/936 |
| 2018/0281668 A1* | 10/2018 | Martin | B60Q 1/2665 |

FOREIGN PATENT DOCUMENTS

| KR | 20-0410297 Y1 | 3/2006 |
|---|---|---|
| KR | 2015-0139741 | 12/2015 |

* cited by examiner

*Primary Examiner* — Allyson N Trail
(74) *Attorney, Agent, or Firm* — Mintz Levin Cohn Ferris Glovsky and Popeo, P.C.; Peter F. Corless

(57) ABSTRACT

A sequential turn signal for a vehicle may include a light source; a filter configured to project a beam from the light source; a shield configured to block a projection area of the beam passing through the filter; and a lens positioned at an opposite side of the filter in relation to the shield. A degree of blinking of the lens is changed according to a degree to which the projection area is blocked by the shield.

17 Claims, 14 Drawing Sheets

SEQUENTIAL TURN SIGNAL USING LASER SOURCE AND METHOD FOR SEQUENTIALLY BLINKING THE SAME

CROSS-REFERENCE TO RELATED APPLICATIONS

This application claims the benefit of priority to Korean Patent Application No. 10-2017-0115370, filed on Sep. 8, 2017, which is incorporated herein by reference in its entirety as if fully set forth herein.

BACKGROUND OF THE DISCLOSURE

Technical Field

Embodiments of the present disclosure relate to sequential turn signals used for a vehicle, and more particularly, to a sequential turn signal using a laser source as a light source.

Description of Related Art

Vehicles use several electric lighting devices such as a headlight, an interior light, a backup light, and the like. Certain vehicle lights are continuously turned on for a predetermined time, while other lighting devices, such as a turn signal and a brake light, blink intermittently during driving.

A light-emitting diode (LED) is often used as a lighting device in vehicles due to advantages such as small power consumption, high illuminance, and semi-permanent lifespan. Illuminance of the LED may be easily adjusted by adjusting the number of LEDs.

Recently, a sequential turn signal that more clearly indicates a direction has been developed by arranging a plurality of LED elements in series, and the serially-arranged LED elements are blinked sequentially toward an outer side of the vehicle. In this regard, FIGS. 1A and 1B illustrate a conventional sequential turn signal using an LED element.

The turn signal 1 includes a plurality of LED elements 2 that are arranged in series and bonded on a PCB 3. LED light emitted from the LED elements 2 recovers linearity through a lens 4 and is emitted to the outside through a cover 5. The LED elements 2 are sequentially blinked in one direction. That is, an LED element 2a located at a relatively left side is first blinked, another LED element 2b located at a right side of the LED element 2a is blinked, and then still another LED element 2c located at a right side of the LED element 2b is blinked. Accordingly, from an outside perspective, the turn signal 1 expresses the vehicle's intention to turn by blinking itself, and additionally indicates the turn direction by sequential blinking.

The conventional sequential turn signal 1 configures a turn indicating system for a vehicle with low power using the LED. However, the LED elements 2 are required for each of the sequential blinking stages, and channels for configuring a controller (LDM) are required for each of the light sources, as illustrated in FIG. 2A.

If multiple channels are applied to the controller 6, the number of parts for configuring the controller 6 increases, and the control logic becomes increasingly complicated. Further, as illustrated in FIG. 2B, since the LED elements 2 are sequentially blinking one-by-one, the light amount is changed in a stepwise manner. That is, a large number of LED elements 2 are required to implement a smooth blinking image.

SUMMARY OF THE DISCLOSURE

Embodiments of the present disclosure enable sequential blinking using a laser as a light source, instead of a plurality of LED elements as employed in conventional systems, thereby significantly reducing the number of parts of the controller and simplifying the design of the controller.

Other objects and advantages of the present disclosure can be understood by the following description, and become apparent with reference to the embodiments of the present disclosure. Also, it is apparent to those skilled in the art to which the present disclosure pertains that the objects and advantages of the present disclosure can be realized by the means as claimed and combinations thereof.

In accordance with embodiments of the present disclosure, a sequential turn signal for a vehicle includes: a light source; a filter configured to project a beam from the light source; a shield configured to block a projection area of the beam passing through the filter; and a lens positioned at an opposite side of the filter in relation to the shield. A degree of blinking of the lens is changed according to a degree to which the projection area is blocked by the shield.

The light source may be a laser diode.

The light source may be transformed into a rectangular projection area by the filter.

As the shield sequentially moves horizontally with respect to the filter, the lens may be sequentially blinked.

As the shield continuously moves horizontally with respect to the filter, the lens may be continuously blinked.

The lens may include a diffusion surface diffusing the beam so that a blinking area is generated by the projection area.

Furthermore, in accordance with embodiments of the present disclosure, a sequential turn signal for a vehicle includes: a light source; a filter configured to project a beam from the light source to be a linear beam; a shield configured to block the linear beam; and a lens configured to be positioned at an opposite side to the filter in relation to the shield. A degree of blinking of the lens is changed according to a degree to which the projection area is blocked by the shield.

The light source may be a laser diode.

As the shield sequentially moves horizontally with respect to the filter, the lens may be sequentially blinked.

As the shield continuously moves horizontally with respect to the filter, the lens may be continuously blinked.

The lens may include a diffusion surface diffusing the linear beam so that a blinking area having a predetermined thickness is generated by the linear beam.

Furthermore, in accordance with embodiments of the present disclosure, a sequential turn signal for a vehicle includes: a light source; a filter configured to project a beam from the light source to be a linear beam; a rotating shield configured to alternately block the linear beam; and a lens configured to be positioned at an opposite side to the filter in relation to the rotating shield. A blinking area of the lens is changed according to an area of the moving shield which blocks the linear beam.

A beam blocking area and a beam passing area may be alternately formed on the rotating shield, the beam blocking area blocking the linear beam while the rotating shield rotates, and the beam passing area allowing the linear beam to pass.

The beam blocking area and the beam passing area of the rotating shield may be formed at 90 degrees with respect to each other.

The beam passing area of the rotating shield may include a section in which a predetermined light amount is maintained regardless of a change in rotation angle of the rotation shield.

Furthermore, in accordance with embodiments of the present disclosure, a method for sequentially blinking the sequential turn signal for a vehicle includes: emitting a beam from a light source; transforming, by a filter, the beam into a linear beam; and alternately blocking and passing, by a rotating shield, the linear beam. When a rotation angle of the rotating shield is changed from a first angle to a second angle, the linear beam that passes the rotating shield linearly increased, and when the rotation angle of the rotating shield is changed from the second angle to a third angle, the linear beam is blocked by the rotating shield.

An amount of light from the linear beam that passes the rotating shield may be constant between the first angle and the second angle.

An interval of 90 degrees may exist between each of the first angle, the second angle, and the third angle.

A cycle of the alternately blocking and passing the linear beam may be 180 degrees.

When the linear beam is blocked, the light source may be turned off.

Furthermore, in accordance with embodiments of the present disclosure, a sequential turn signal for a vehicle using a laser source includes: a laser diode; a filter configured to project a beam from the laser diode as a linear beam; a moving shield configured to linearly block the linear beam; and a lens positioned at an opposite side of the filter in relation to the moving shield. A blinking area of the lens is changed according to an area of the moving shield which blocks the linear beam.

The moving shield may include a slider that linearly slides, a rotating plate driving the slider in a horizontal direction, and a spring elastically returning the slider.

A driven gear portion may be horizontally formed at one side of the slider, the driven gear portion meshing with a gear portion having teeth formed at the rotating plate to rotate the rotating plate so that the slide moves in the horizontal direction.

When the linear beam is blocked, the laser diode may be turned off.

The teeth of the gear portion of the rotating plate may be formed only in an area corresponding to 180 degrees of a circumferential edge of the rotating plate.

When the rotating plate rotates by 180 degrees, the moving shield may return to an original position by the elasticity of the spring.

The sequential turn signal may be turned off in a section in which the rotating plate rotates by 180 degrees to 360 degrees.

Furthermore, in accordance with embodiments of the present disclosure, a method for sequentially blinking a sequential turn signal for a vehicle using a laser beam includes: emitting a point laser beam from the laser diode; transforming, by the filter, the laser beam into a linear beam; and blocking or passing, by the moving shield, the linear beam. When the rotating shield rotates from a fourth angle to a fifth angle, the linear beam that passes is linearly increased, and when the rotating shield rotates from the fifth angle to a sixth angle, the linear beam is blocked.

A constant amount of light from the linear beam that passes the shield between the fourth angle and the fifth angle.

An interval of 180 degrees may exist between each of the fourth angle, the fifth angle, and the sixth angle.

When the linear beam is blocked, the laser diode may be turned off.

BRIEF DESCRIPTION OF THE DRAWINGS

The embodiments herein may be better understood by referring to the following description in conjunction with the accompanying drawings, briefly described below, in which like reference numerals indicate identically or functionally similar elements.

Figure 1A:
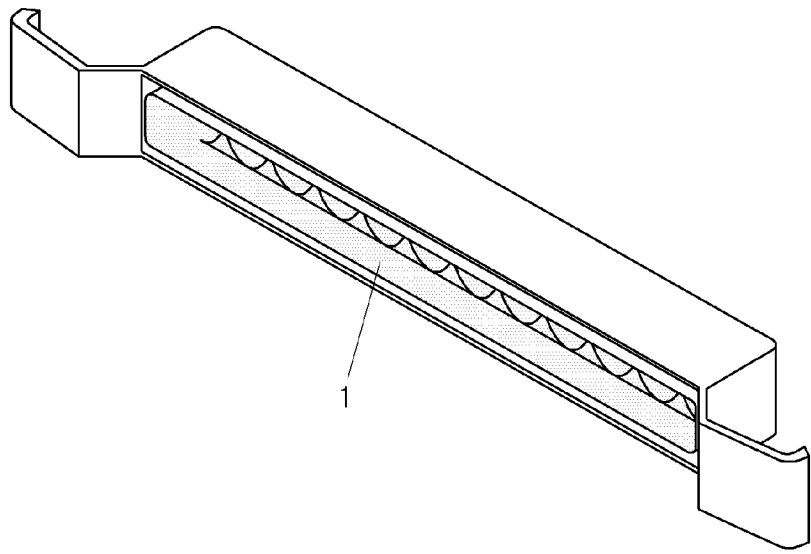
FIGS. 1A and 1B include a perspective view and a cross-sectional view illustrating a conventional sequential turn signal using an LED element.
Figure 1B:
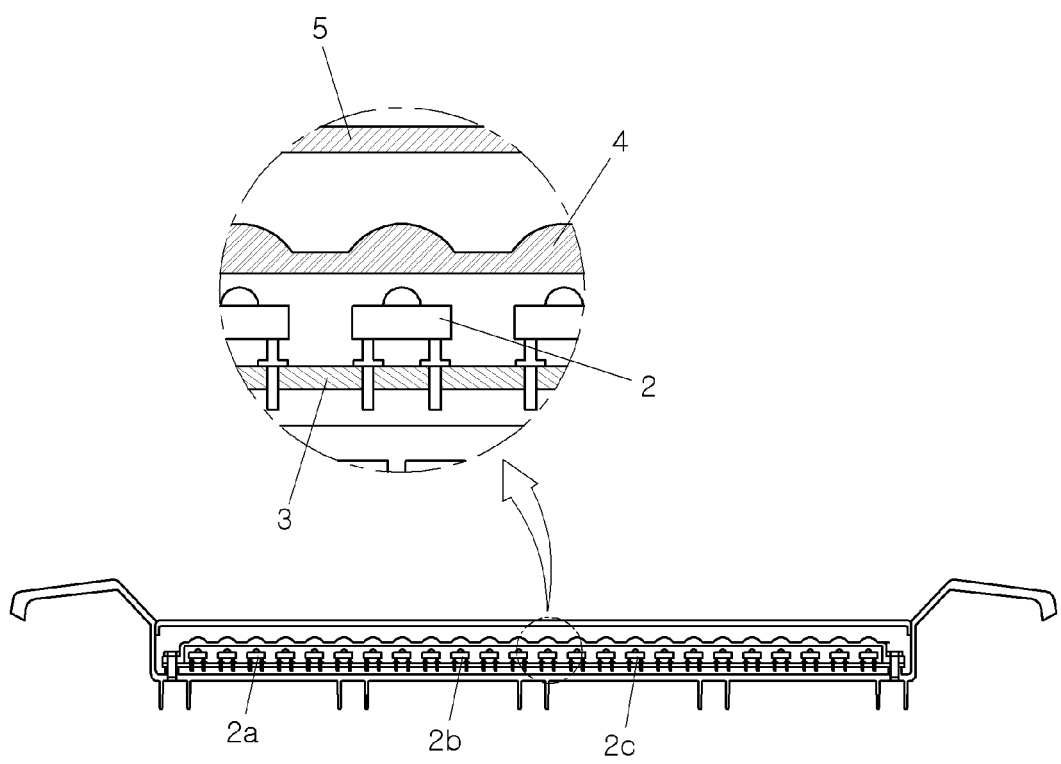
Figure 2A:
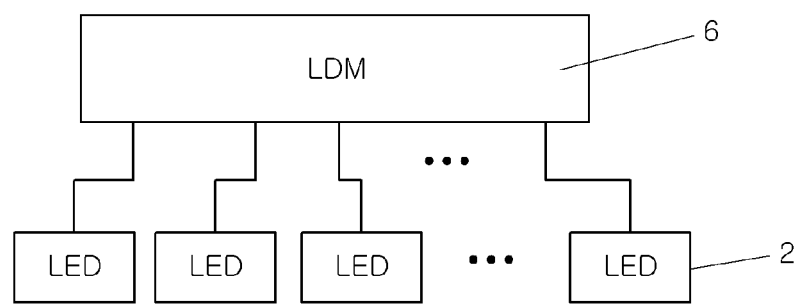
FIGS. 2A and 2B include schematic views illustrating a control configuration and a change in a light amount of the conventional sequential turn signal using an LED element.
Figure 2B:
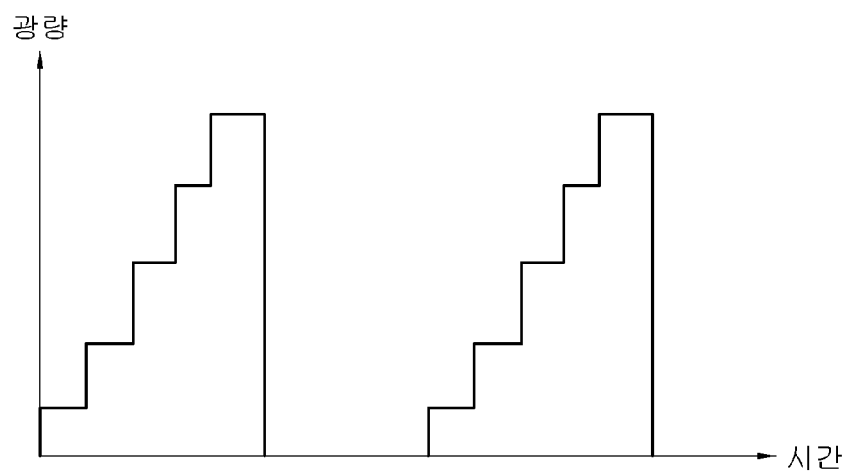

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DESCRIPTION OF SPECIFIC EMBODIMENTS

Embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

Description of matters that are similar to the related art and are not necessary for understanding the technical idea of the present disclosure will be omitted, but the technical idea and the scope of the protection of the present disclosure are not limited thereto.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Figure 3:
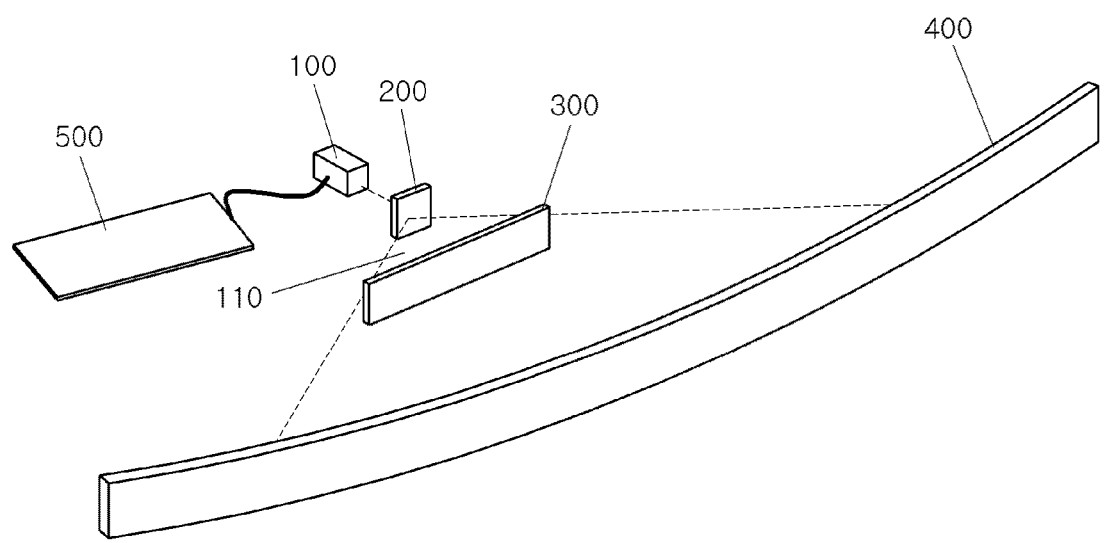
FIG. 3 is a schematic view illustrating a configuration of a sequential turn signal using a laser source according to embodiments of the present disclosure.

Referring now to the presently disclosed embodiments, FIG. 3 is a schematic view illustrating a configuration of a sequential turn signal using a laser source according to the present disclosure.

As shown in FIG. 3, a sequential turn signal using a laser source according to embodiments of the present disclosure includes a light source 100, a filter 200 projecting a beam from the light source 100, a shield 300 capable of blocking a projection area of the beam passing through the filter 200, and a lens 400 positioned at an opposite side to the filter 200 in relation to the shield 300.

According to embodiments of the present disclosure, a degree of blinking of the lens 400 is changed according to a degree of blocking, by the shield 300, the projection area.

The light source 100 may be a laser diode 100 emitting a laser beam.

The filter 200 may be a diffusion filter 200 projecting the laser beam to be a linear beam. At this time, the filter 200 serves to widely diffuse a point light source from the laser diode 100 to be transformed into a linear beam.

If the light source 100 is the laser diode 100, the laser diode 100 refers to a typical laser light emitting element amplifying short-wavelength light and emitting the amplified light only in one direction, and emits blue light, red light, transparent light, or the like depending on a medium.

According to embodiments of the present disclosure, the turn signal for a vehicle may be configured using the laser diode 100, thus a method of using a red laser diode 100 as it is or a method of emitting transparent infrared light and using an additional filter (not illustrated) to convert the transparent light into a yellow light.

Meanwhile, the light source 100 may be transformed into a rectangular projection area by the filter 200.

According to embodiments of the present disclosure, as the shield 300 relatively sequentially moves horizontally with respect to the filter 200, the lens 400 is sequentially blinked.

Alternatively, as the shield 300 relatively continuously moves horizontally with respect to the filter 200, the lens 400 is continuously blinked.

According to embodiments of the present disclosure, the lens 400 may further include a diffusion surface (not illustrated) to which a beam in a form of thin linear beam hits to diffuse the beam so that a blinking area 410 having a predetermined thickness is generated.

Further, the lens 400 may further include, at one surface thereof, a heat sink (not illustrated) preventing a temperature from being increased by the beam hitting the surface of the lens 400. The heat sink (not illustrated) is formed of a general plate type material with high thermal conductivity and includes a fin on a surface thereof to enhance heat transfer.

Figure 4A:
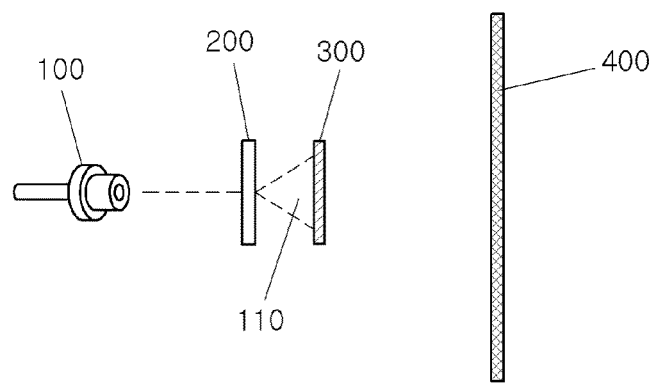
FIGS. 4A to 4C include sequential schematic views for describing an operation of the sequential turn signal using a laser source according to embodiments of the present disclosure.
Figure 4B:
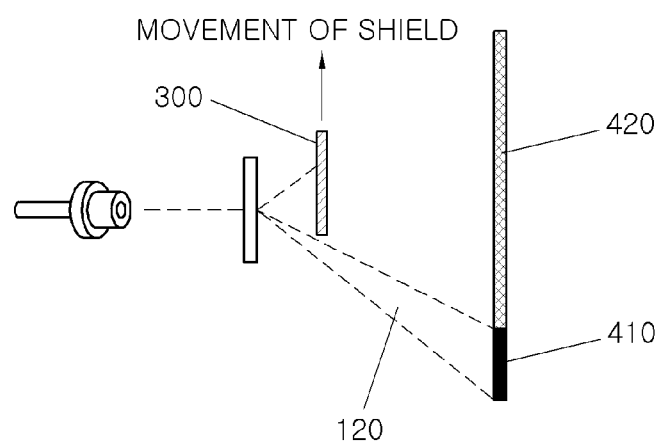
Figure 4C:
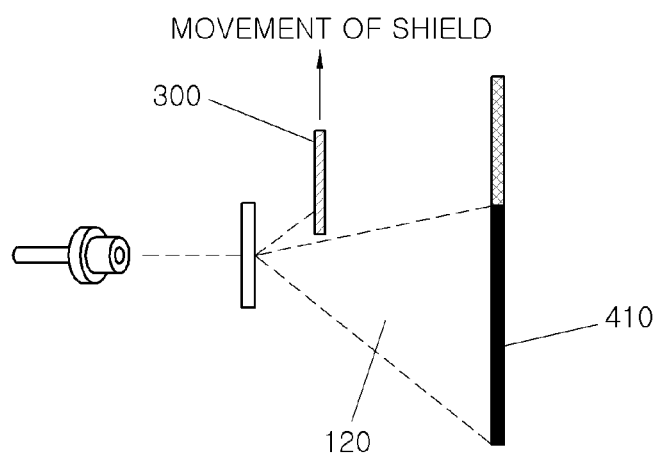

FIGS. 4A to 4C include sequential schematic views for describing an operation of the sequential turn signal using a laser source according to embodiments of the present disclosure.

As shown in FIG. 4A, in the early stage, the shield 300 blocks an entire first irradiation area 110 formed by the linear beam, thus there is no laser beam passing toward the lens 400. However, as the shield 300 gradually moves upward as illustrated in FIGS. 4B and 4C, the linear beam of the first irradiation area 110 passes through an area where the shield 300 is positioned to reach the lens 400.

The linear beam reaching the lens 400 forms the blinking area 410, and the blinking area 410 is sequentially lengthened according to the movement of the shield 300, thereby implementing turn indication through smooth sequential blinking.

As the shield 300 moves, a second irradiation area 120 is gradually widened, and ultimately, when the shield 300 reaches a peak and does not block the first irradiation area 110 any more, a maximum-sized blinking area 410 is formed.

Meanwhile, according to embodiments of the present disclosure, if the laser diode 100 is used as the light source 100, a controller (LDM) 500 for oscillating the laser diode 100 is further included.

Since the controller 500 according to embodiments of the present disclosure controls only one laser diode 100, control logic is simple, and the number of required electronic parts is minimized, unlike the sequential turn signal using a plurality of LED elements according to the relate art.

Meanwhile, as illustrated in FIGS. 4A to 4C, the shield 300 blocks the linear beam passing through the filter 200 and then sequentially passes the linear beam toward the lens 400 to form the blinking area 410 on the lens 400.

Further, the light source 100 may be transformed into a rectangular projection area or transformed into a linear beam by the filter 200.

As the shield 300 relatively sequentially or continuously moves horizontally with respect to the filter 200, the lens 400 is sequentially blinked.

First Embodiment

Figure 5A:
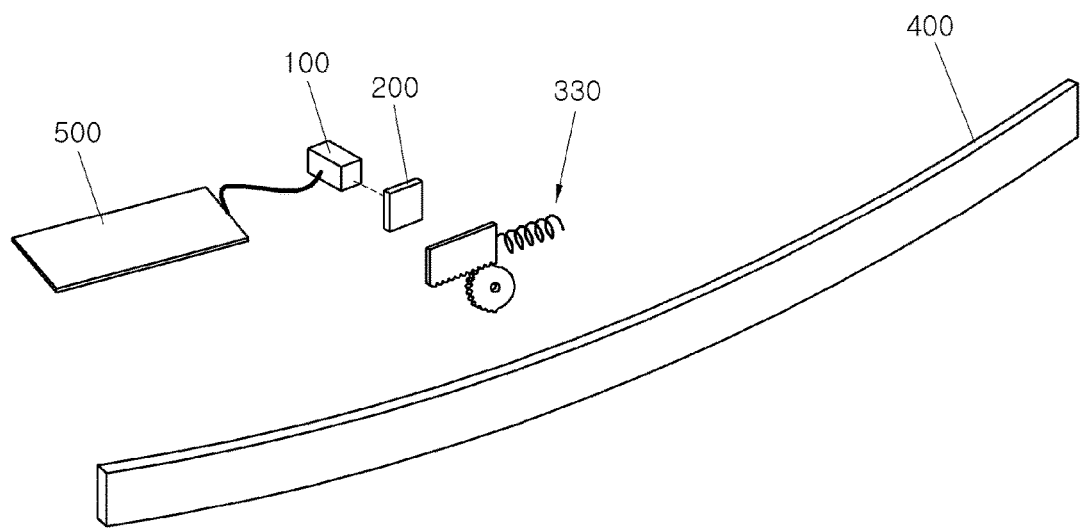
FIGS. 5A to 5C include perspective views and a graph for describing a sequential turn signal using a laser source according to a first embodiment of the present disclosure.
Figure 5B:
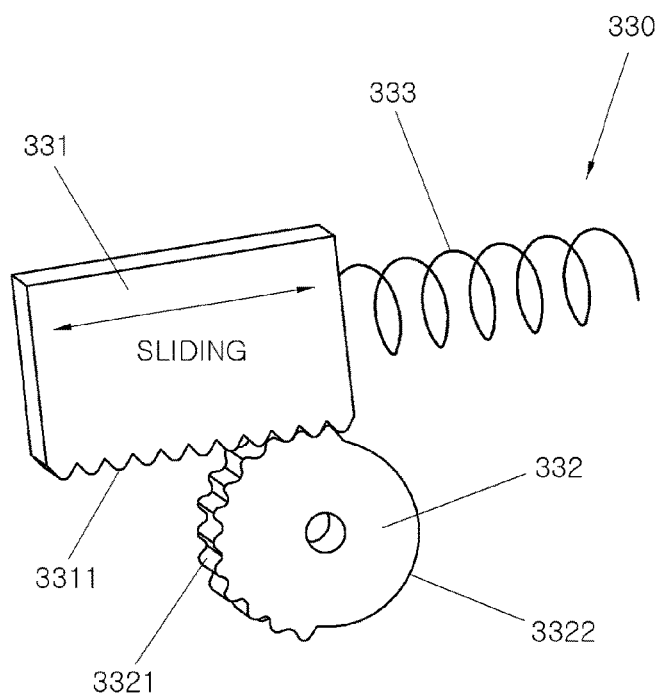
Figure 5C:
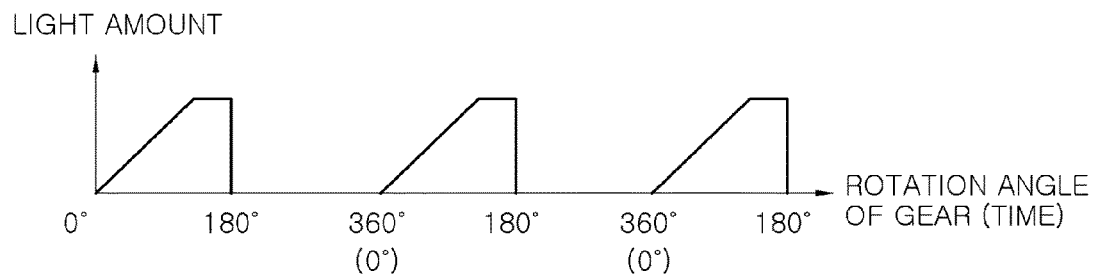
Figure 6A:
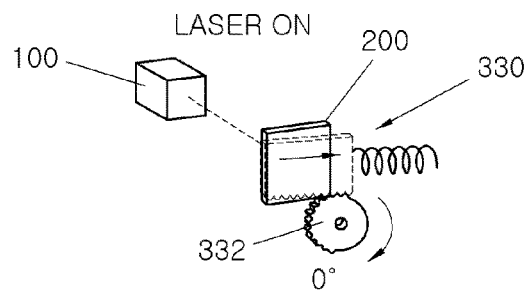
FIGS. 6A to 6D include sequential schematic views for describing an operation the sequential turn signal using a laser source according to the first embodiment of the present disclosure.
Figure 6B:
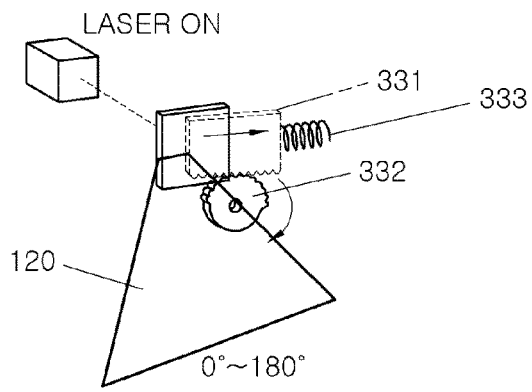
Figure 6C:
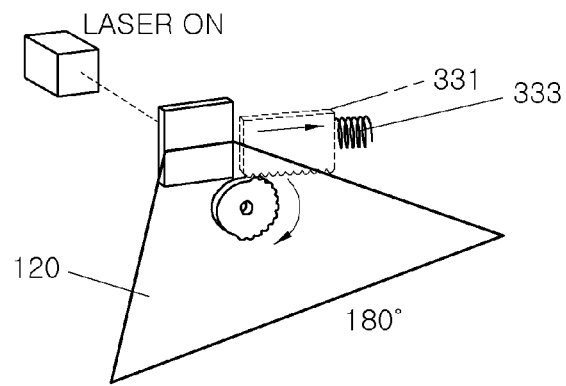
Figure 6D:
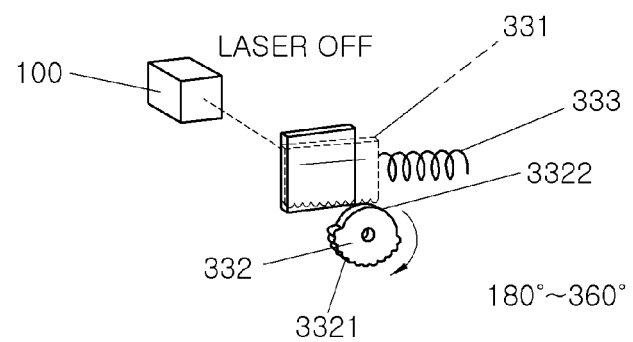

FIGS. 5A to 5C include perspective views and a graph for describing a sequential turn signal using a laser source according to a first embodiment of the present disclosure.

As shown in FIGS. 5A to 5C, a sequential turn signal using a laser source according to a first embodiment of the present disclosure will be described in more detail.

The sequential turn signal using a laser source according to the first embodiment of the present disclosure includes a light source 100, a filter 200 projecting a beam from the light source 100 to be a linear beam, a moving shield 330 capable of linearly blocking the linear beam, and a lens 400 positioned at an opposite side to the filter 200 in relation to the moving shield 330.

A blinking area of the lens 400 is changed according to an area in which the moving shield 330 blocks the linear beam.

The light source 100 may be a laser diode 100 emitting a laser beam.

According to the first embodiment of the present disclosure, as illustrated in FIGS. 5A to 5C, if the light source 100 is the laser diode 100, the controller 500 controlling the laser diode 100 may be further included.

The laser diode 100, the filter 200, the lens 400, and the controller 500 have been described above in detail, thus further description therefor will be omitted.

In the sequential turn signal using a laser source according to the first embodiment of the present disclosure, the moving shield 330 mechanically blocks or passes the linear beam.

To this end, the moving shield includes a slider 331 that linearly slides, a rotating plate 332 driving the slider 331 in a horizontal direction, and a spring 333 returning the slider 331 to an original position by its elasticity.

In order to transfer driving force, a driven gear portion 3311 is horizontally formed at one cross section or one side of the slider 331.

A gear portion 3321 meshing with the driven gear part 3311 to convert rotation force of the rotating plate 332 into linear driving force is formed at a partial edge of the rotating plate 332. As the rotating plate 332 rotates, the slider 331 horizontally moves.

Meanwhile, a sliding portion 3322 is formed at the remaining edge of the rotating plate 332 at which the gear portion 3321 is not formed. The sliding portion 3322 may simply mean an area in which a gear is not formed.

The slider 331 first slides by the gear portion 3321, and when the driven gear portion 3311 and the sliding portion 3322 of the rotating plate 332 meet each other, returns to the original position by the elasticity of the spring 333.

Accordingly, the slider 331 blocks a first irradiation area 110 of the linear beam formed by the filter 200, and then increasingly passes the linear beam to form a second irradiation area 120, and ultimately, form a blinking area 410 in the lens 400.

That is, the blinking area 410 is expanded from a rotation angle (hereinafter referred to as a "fourth angle") at which the gear portion 3321 of the rotating plate 332 meshes with the driven gear portion 3311 of the slider 331 to start rotation to a rotation angle (hereinafter referred to as a "fifth angle") at which The driven gear portion 3311 of the slider 331 meets the sliding portion of the rotating plate 332 to start return to the original position as the first irradiation surface 110 is gradually expanded. Then, the linear beam is blocked up to a rotation angle (hereinafter referred to as a "sixth angle") at which the gear portion 3321 of the rotating plate 332 again meets the driven gear portion 3311 of the slider 331.

Teeth of the gear portion 3321 of the rotating plate 332 may be formed along a circumferential edge of the rotating plate 332 only in an area corresponding to 180 degrees of the circumferential edge. In the remaining area of the circumference, the sliding portion 3322 is formed. Accordingly, when the rotating plate 332 rotates 180 degrees, the moving shield 330 returns to the original position by the elasticity of the spring 333.

According to the first embodiment of the present disclosure, when the moving shield 330 blocks the linear beam, the light source 100, more specifically, the laser diode 100 may be turned off.

As illustrated in FIGS. 5A to 5C, if the teeth of the gear portion 3321 of the rotating plate 332 are formed along the circumference in the area corresponding to 180 degrees of the circumference, when the slider 331 returns to the original position, the light source 100, more specifically, the laser diode 100 may be turned off.

Meanwhile, FIGS. 6A to 6E include sequential schematic views for describing an operation of the sequential turn signal using a laser source according to the first embodiment of the present disclosure.

Next, referring to FIGS. 6A to 6D, an operating method of the sequential turn signal using a laser source according to the first embodiment of the present disclosure will be described in more detail.

The operating method according to the first embodiment of the present disclosure, that is, a method for sequentially blinking a turn signal including a light source 100, a filter 200 projecting the beam from the light source 100 to be a linear beam, a moving shield 330 capable of linearly blocking the linear beam, and a lens 400 positioned at an opposite side to the filter 200 in relation to the moving shield 330 includes: emitting a point beam from the light source 100, transforming, by the filter 200, the beam into a linear beam, and blocking or passing, by the moving shield 330, the linear beam, in which in the blocking or passing, the moving shield 330 is moved by a rotating plate 332 that rotates, the rotating plate 332 rotates from the fourth angle to the fifth angle to linearly increase the linear beam that passes, and the rotating plate 332 rotates from the fifth angle to the sixth angle to block the linear beam.

Between the fourth angle and the fifth angle of the rotating plate 332, a constant light amount area in which a light amount by the linear beam that passes is constant may exist.

Meanwhile, the fourth angle, the fifth angle, and the sixth angle of the rotating plate 332 may have an interval of 90 degrees thereamong.

Meanwhile, in the blocking or passing, when the moving shield 330 blocks the linear beam, the light source 100, more specifically, the laser diode 100 may be turned off.

Next, referring to FIGS. 6A to 6D, the first embodiment of the present disclosure will be described in more detail.

First, the controller 500 is operated so that the laser diode 100 emits a laser beam in a form of point light source. The laser beam is converted into a linear beam by passing through the filter 200.

The linear beam is blocked by the moving shield 330.

Next, as the rotating plate 332 rotates, the slider 331 moves to the right by the operation of the gear portion 3321 and the driven gear portion 3311 meshing with each other.

Accordingly, a part of the linear beam that is blocked passes through the area of the moving shield 330 to reach the lens 400, thereby forming the blinking area 410.

As the moving shield 330 sequentially moves to the right, the laser beam reaching the blinking area 410 is gradually increased.

When the moving shield 330 reaches a maximum movement point, the controller 400 turns off the laser diode 100 so that the laser diode 100 does not discharge the laser beam any more.

At this time, the meshing between the gear portion 3321 of the rotating plate 332 and the driven gear portion 3311 of the slider 331 ends, and instead, the sliding portion 3322 of the rotating portion 332 is in contact. The rotation of the rotating plate 332 is continued, but the sliding portion 3322 may not apply driving force to the slider 331 any more, thus the slider suddenly moves to the leftmost side by the spring 333 elastically supporting the slider 331.

When the gear portion 3321 of the rotating plate 332 is about to mesh with the driven gear portion 3311 of the slider 331, the controller 500 turns on the laser diode 100 again.

A sequential blinking action in which the blinking area 410 of the lens 400 is gradually lengthened and completely disappears according to repetitive operation of the controller 500 and the rotating plate 332, and then is again gradually lengthened appears.

That is, the turn signal includes the laser diode 100, the filter 200 projecting the beam from the laser diode 100 to be a linear beam, the moving shield 330 capable of linearly blocking the linear beam, and the lens 400 positioned at an opposite side to the filter 200 in relation to the moving shield 330, in which the blinking area of the lens 400 is changed according to the area in which the moving shield 330 blocks the linear beam.

Further, the moving shield 330 includes a slider 331 that linearly slides, a rotating plate 332 that drives the slider 331 in a horizontal direction, and a spring 333 returning the slider 331 by its elasticity, and a driven gear portion 3311 is horizontally formed at one side of the slider 331, meshes with a gear portion 3321 having teeth formed at the rotating plate 332 to rotate the rotating plate 332 so that the slide 331 moves in the horizontal direction.

When the linear beam is blocked, the laser diode 100 is turned off, when the rotating plate 332 rotates by 180 degrees, the moving shield 330 returns to the original position by the elasticity of the spring 333, the teeth of the gear portion 3321 of the rotating plate 332 is formed only in an area corresponding to 180 degrees of a circumferential edge of the rotating plate 332, and the turn signal is turned off in a section from 180 degrees to 360 degrees.

Figure 7:
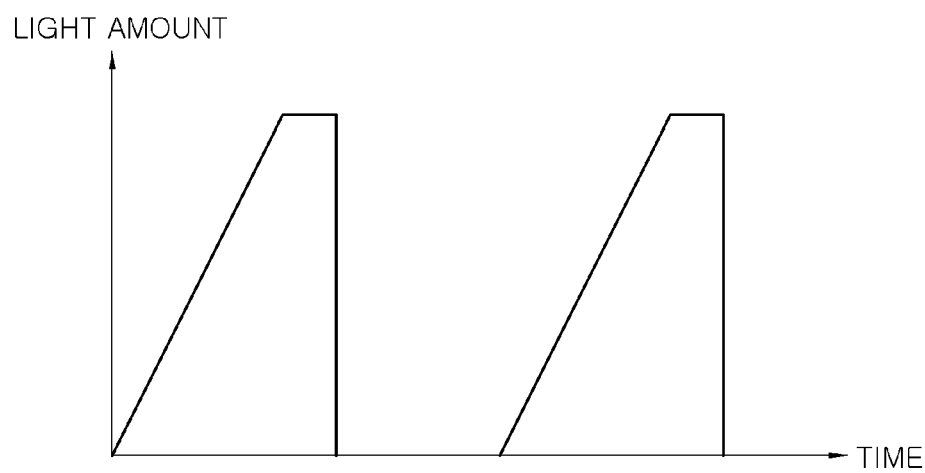
FIG. 7 illustrates graphs of a light amount for describing an effect of the sequential turn signal using a laser source according to the first embodiment of the present disclosure.
Figure 7:
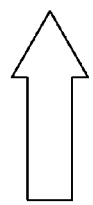
Figure 7:
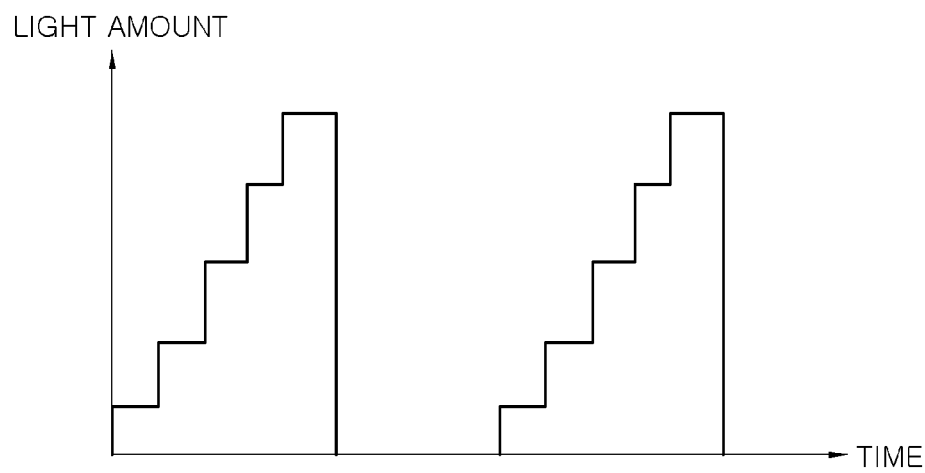

FIG. 7 illustrates graphs of a light amount for describing an effect of the sequential turn signal using a laser source according to the first embodiment of the present disclosure.

In a conventional sequential turn signal using an LED element, a light amount is changed stepwise to give intermittent feeling, whereas, in the sequential turn signal using a laser source according to the first embodiment of the present disclosure, a light amount is smoothly changed, such that it is aesthetically pleasing and excellent technical performance is achieved.

Second Embodiment

Figure 8:
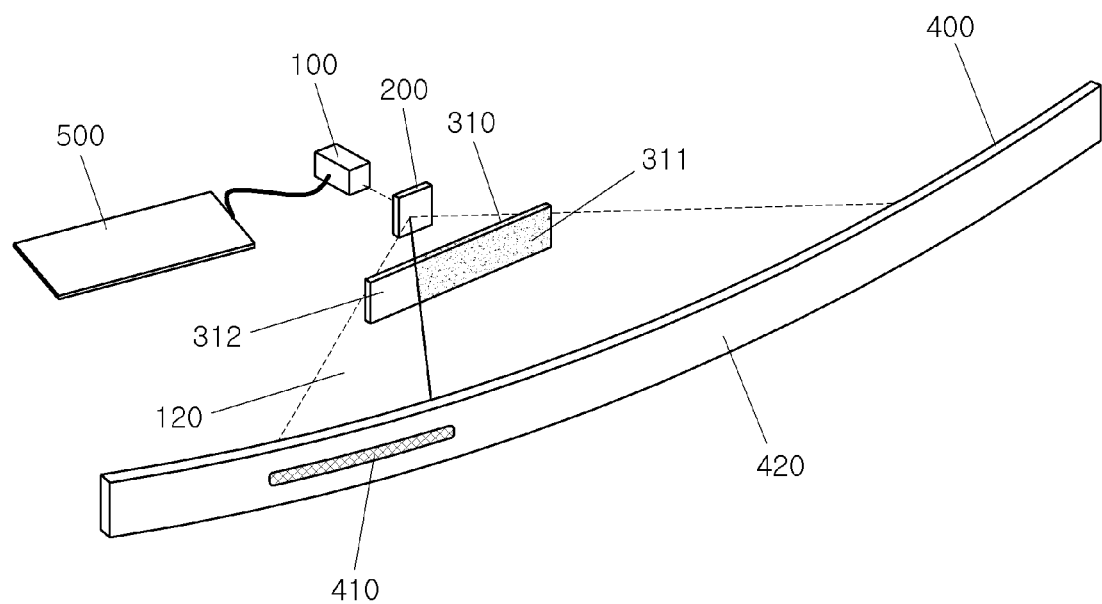
FIG. 8 is a perspective view illustrating a sequential turn signal using a laser source according to a second embodiment of the present disclosure.

FIG. 8 is a perspective view illustrating a sequential turn signal using a laser source according to a second embodiment of the present disclosure.

As shown in FIG. 8, a sequential turn signal using a laser source according to a second embodiment of the present disclosure will be described in detail.

The second embodiment of the present disclosure has a configuration that is the same as or similar to the first embodiment, except for the shield 300.

In the sequential turn signal using a laser source according to the second embodiment of the present disclosure, the shield 300 is an electronic shield 310.

The electronic shield 310 collectively refers to all display apparatuses that are opaque when power is not applied, and are changed to be transparent when power is applied to transmit a laser beam.

As illustrated in FIG. 8, the electronic shield 310 includes an opaque portion 311 and a transparent portion 312. The opaque portion 311 is an area (referred to herein as a "beam blocking area") of blocking a laser beam when power is not applied, and the transparent portion 312 is an area (referred to herein as a "beam transmission area") that is changed to be transparent as the power is applied to pass the laser beam.

In the sequential turn signal using a laser beam according to the second embodiment of the present disclosure, the controller 500 controls the electronic shield 310 together. The controller 500 divides an area of the electronic shield 310 and sequentially applies power, such that the transparent portion 312 is expanded in one direction.

In FIG. 8, the transparent portion 312 of the electronic shield 310 is formed at a left side and is gradually expanded.

Accordingly, the linear beam that is blocked by the opaque portion 311 of the electronic shield 310 passes through the transparent portion 312 to reach the lens 400, thereby forming a linear blinking area 410.

As the transparent portion 312 is expanded by the control of the controller 500, the blinking area 410 is also sequentially lengthened.

Figure 9A:
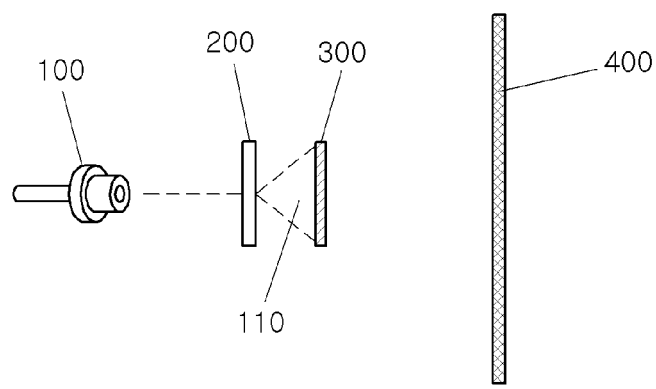
FIGS. 9A to 9C include sequential schematic views for describing an operation of the sequential turn signal using a laser source according to the second embodiment of the present disclosure.
Figure 9B:
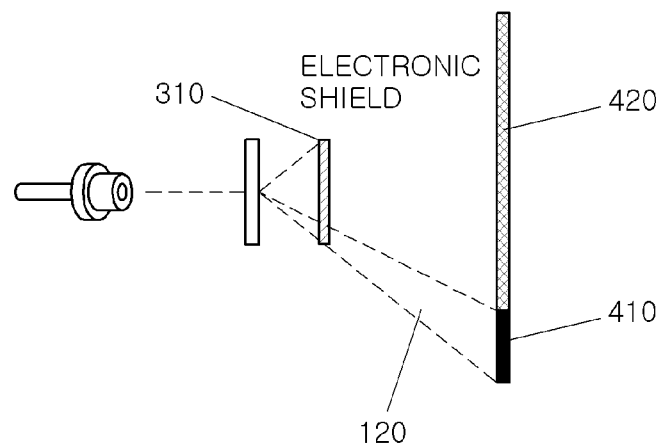
Figure 9C:
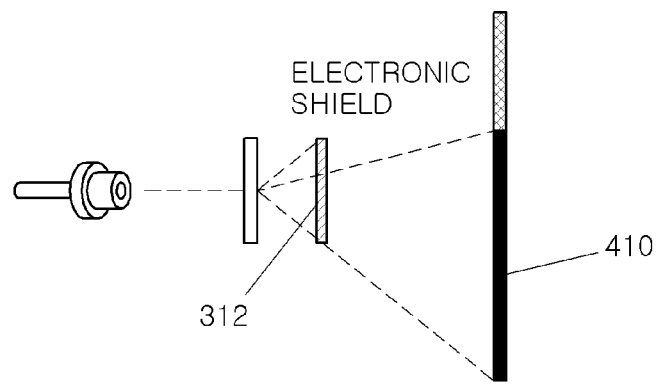

FIGS. 9A to 9C include sequential schematic views for describing an operation of the sequential turn signal using a laser source according to the second embodiment of the present disclosure.

According to the second embodiment, the electronic shield 310 is used, and a size of the transparent portion 312 of the electronic shield 310 is electronically controlled. Therefore, unlike the first embodiment, there is no need to turn off the laser diode 100.

Third Embodiment

Next, referring to FIGS. 10A and 10B, a sequential turn signal using a laser source according to a third embodiment of the present disclosure will be described in detail.

The third embodiment of the present disclosure has a configuration that is the same as or similar to the first embodiment, except for the shield 300.

The sequential turn signal using a laser source according to the third embodiment of the present disclosure includes a light source 100, a filter 200 projecting a beam from the light source 100 to be a linear beam, a rotating shield 320 capable of alternately blocking the linear beam, and a lens 400 positioned at an opposite side to the filter 200 in relation to the rotating shield 320.

A blinking area of the lens 400 is changed according to an area in which the rotating shield 320 blocks the linear beam.

In the rotating shield 320, a beam blocking area 321 blocking the linear beam while rotating based on a rotation center 323 and a beam passing area 322 passing the linear beam are alternately formed.

Figure 10A:
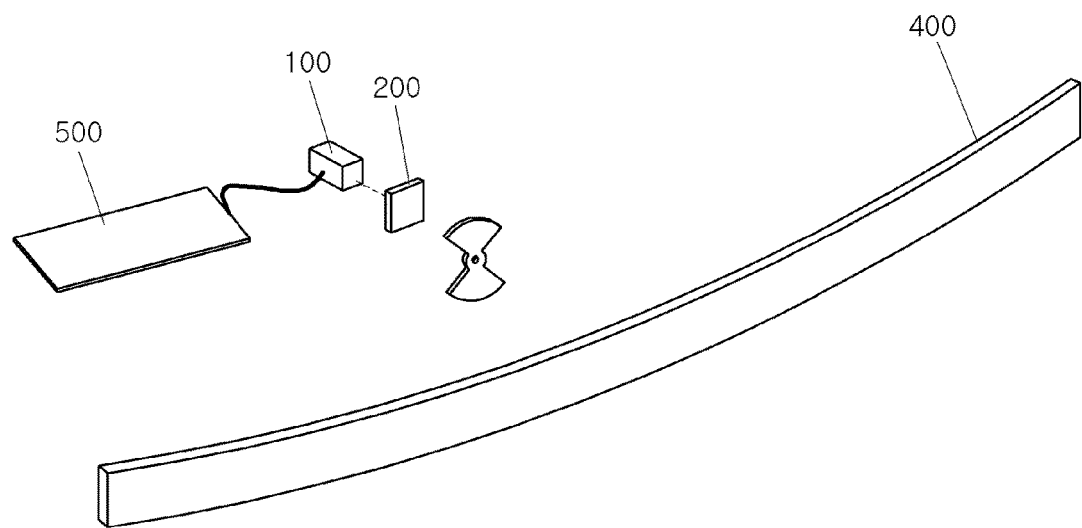
FIGS. 10A and 10B include perspective views illustrating a sequential turn signal using a laser source according to a third embodiment of the present disclosure.
Figure 10B:
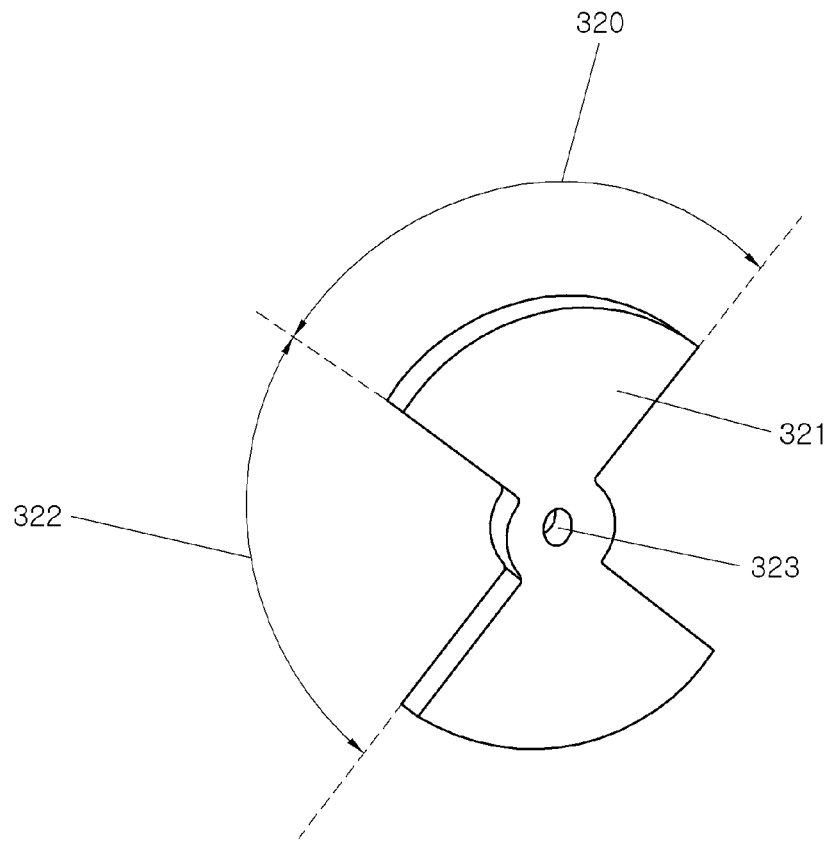

As an example, the rotating shield 320 is formed in a rotating disc shape as illustrated in FIGS. 10A and 10B, in which beam blocking areas 321 each having a fan shape are formed at an upper portion and a lower portion, respectively, and beam passing areas 322 are formed between the beam blocking areas 321. As a result, in the rotating shield 320, the beam blocking area 321 blocking the linear beam while rotating based on the rotation center 323 and the beam passing area 322 passing the linear beam may be alternately formed. Further, the beam blocking area 321 and the beam passing area 322 of the rotating shield 320 may be formed at 90 degrees.

In the rotating shield 320, as illustrated in FIGS. 10A and 10B, if the beam blocking area 321 is positioned at an uppermost side so that a rotation angle is set to be a first angle from a vertical line to block the linear beam from the filter 200, the linear beam is blocked, thus there is no beam reaching the lens 400.

Meanwhile, if the rotating shield 320 rotates based on the rotation center 323 and the beam passing area 322 is positioned at the uppermost side (also see FIG. 11C) so that the rotation angle is set to be a second angle, all linear beams pass through the rotating shield 320 to reach the lens 400.

If the rotating shield 320 rotates based on the rotation center 323 and the rotation angle is set to be a third angle so that the other beam blocking area 321 is positioned at the uppermost side (also see FIG. 11D), the linear beam is blocked again, thus there is no beam reaching the lens 400.

Meanwhile, in the beam passing area 322 of the rotating shield 320, a section in which a predetermined light amount may be maintained regardless of the change in the rotation angle may be formed.

The rotating shield 320 sequentially or continuously blocks or passes the linear beam passing through the filter 200 while rotating based on the rotation center 323 formed at a center thereof.

Next, referring to FIGS. 11A to 11E, an operating method of the sequential turn signal using a laser source according to the third embodiment of the present disclosure will be described in detail.

According to the third embodiment of the present disclosure, an operation method of the sequential turn signal using a laser source, including a light source 100, a filter 200 projecting the beam from the light source 100 to be a linear beam, a rotating shield 320 capable of alternately blocking the linear beam, and a lens 400 positioned at an opposite side to the filter 200 in relation to the rotating shield 320 includes: emitting a point beam from the light source 100, transforming, by the filter 200, the beam into a linear beam, and alternately blocking or passing, by the rotating shield 320, the linear beam, in which in the alternately blocking or passing, the linear beam that passes is linearly increased from the first angle to the second angle, and the linear beam is blocked from the second angle to the third angle.

With respect to the alternately blocking or passing, between the first angle and the second angle, a constant light amount area in which a light amount by the linear beam that passes is constant may exist.

Meanwhile, as illustrated in FIGS. 10A to 11E, the first angle, the second angle, and the third angle of the rotating shield 320 may have an interval of 90 degrees thereamong.

In the alternately blocking or passing according to embodiments of the present disclosure, a cycle of the alternation may be 180 degrees. Also, with respect to the alternately blocking or passing according to embodiments of the present disclosure, when blocking the linear beam, the light source 100 may be turned off.

Figure 11A:
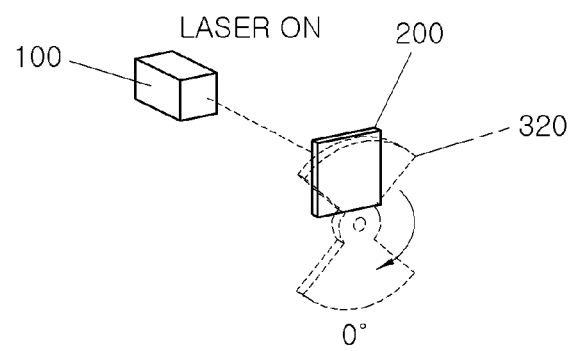
FIGS. 11A to 11E include sequential schematic views for describing an operation of the sequential turn signal using a laser source according to the third embodiment of the present disclosure.

The third embodiment of the present disclosure will be described in more detail with reference to FIGS. 11A to 11E. In the early stage, as illustrated in FIG. 11A, the beam blocking area 321 of the rotating shield 320 blocks the entire linear beam passing through the filter 200.

Figure 11B:
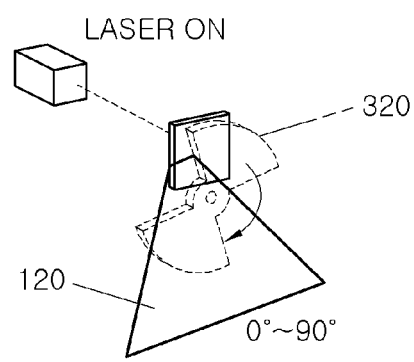

Next, as illustrated in FIG. 11B, when the rotating shield 320 rotates so that the beam blocking area 320 rotates in a clockwise direction and the beam passing area 322 rises, the blocked linear beam passes through the beam passing area 322 to reach the lens 400, thereby forming the blinking area 410.

As the rotating shield 320 rotates, a size of the beam passing area 322 is gradually sequentially or continuously increased, and the blinking area 410 is expanded accordingly.

Figure 11C:
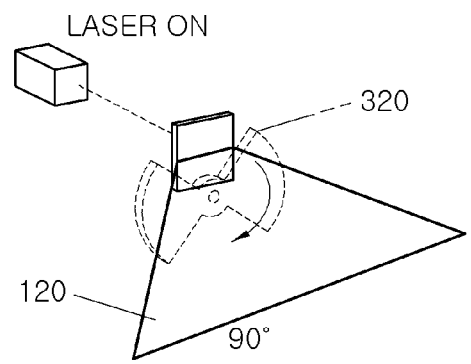
Figure 11D:
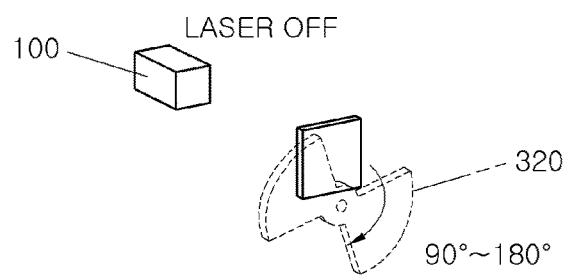
Figure 11E:
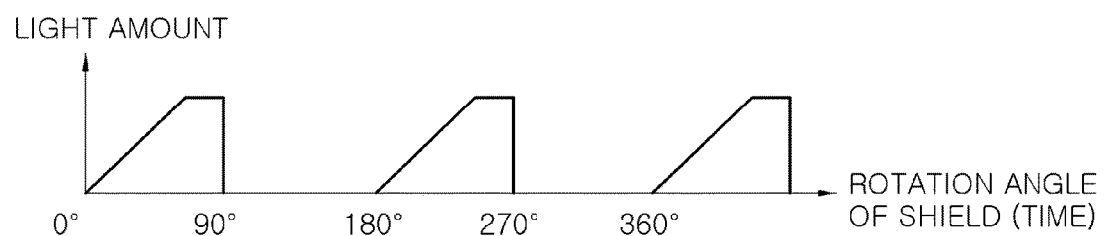

As illustrated in FIG. 11C, when the beam passing area 322 completely rotates, a maximum-sized blinking area 410 is formed.

Next, the controller 500 controls the laser diode 100 to turn off generation of the laser beam.

Next, the rotating shield 320 is continuously rotated from the second angle to the third angle, such that the other beam blocking area 210 may be positioned to block the linear beam of the filter 200.

Next, the laser diode 100 is turned on to emit a laser beam.

The above processes are repeatedly performed, such that the sequential turn signal is implemented in a smooth manner, rather than a stepwise manner.

In the sequential turn signal using a laser source according to the third embodiment of the present disclosure, the number of beam blocking area 321 and the beam passing area 322 may be changed according a rotating speed of the rotating shield 320. This is apparent to those skilled in the art, thus detailed description therefor will be omitted.

The sequential turn signal using a laser source according to embodiments of the present disclosure implements the sequential blinking function using one light source, thereby enabling continuous change in light emission.

The sequential turn signal using a laser source according to embodiments of the present disclosure uses only one light source, thereby simplifying configuration of the controller and reducing the number of parts.

In the sequential turn signal using a laser source according to embodiments of the present disclosure, since there is no need to set multiple channels unlike the conventional sequential turn signal, the design of the controller is simple, and complicated logic is not required.

The present disclosure is not limited to certain embodiments but may be variously applied, and may be variously modified by those skilled in the art to which the present disclosure pertains without departing from the gist of the present disclosure claimed in the claims.

What is claimed is:

1. A sequential turn signal for a vehicle, comprising:
   a light source;
   a filter configured to project a beam from the light source;
   a shield configured to block a projection area of the beam passing through the filter; and
   a lens positioned at an opposite side of the filter in relation to the shield,
   wherein a degree of blinking of the lens is changed according to a degree to which the projection area is blocked by the shield, and
   wherein the light source is transformed into a rectangular projection area by the filter.

2. The sequential turn signal of claim 1, wherein the light source is a laser diode.

3. The sequential turn signal of claim 1, wherein, as the shield sequentially moves horizontally with respect to the filter, the lens is sequentially blinked.

4. The sequential turn signal of claim 1, wherein, as the shield continuously moves horizontally with respect to the filter, the lens is continuously blinked.

5. The sequential turn signal of claim 1, wherein the lens includes a diffusion surface diffusing the beam so that a blinking area is generated by the projection area.

6. The sequential turn signal of claim 1, wherein the beam is a linear beam; and the shield is a rotating shield configured to alternately block the linear beam.

7. The sequential turn signal of claim 6, wherein a beam blocking area and a beam passing area are alternately formed on the rotating shield, the beam blocking area blocking the linear beam while the rotating shield rotates, and the beam passing area allowing the linear beam to pass.

8. The sequential turn signal of claim 7, wherein the beam blocking area and the beam passing area of the rotating shield are formed at 90 degrees with respect to each other.

9. The sequential turn signal of claim 7, wherein the beam passing area of the rotating shield includes a section in which a predetermined light amount is maintained regardless of a change in rotation angle of the rotation shield.

10. A method for sequentially blinking a sequential turn signal for a vehicle, the method comprising:
    emitting a beam from a light source;
    transforming, by a filter, the beam into a linear beam; and
    alternately blocking and passing, by a rotating shield, the linear beam, wherein
    when a rotation angle of the rotating shield is changed from a first angle to a second angle, the linear beam that passes the rotating shield linearly increased,
    when the rotation angle of the rotating shield is changed from the second angle to a third angle, the linear beam is blocked by the rotating shield, and
    wherein an interval of 90 degrees exists between each of the first angle, the second angle, and the third angle.

11. The method of claim 10, wherein a constant amount of light from the linear beam passes the rotating shield between the first angle and the second angle.

12. The method of claim 10, wherein a cycle of the alternately blocking and passing the linear beam is 180 degrees.

13. The method of claim 10, wherein, when the linear beam is blocked, the light source is turned off.

14. A sequential turn signal for a vehicle using a laser source, comprising:
    a laser diode;
    a filter configured to project a beam from the laser diode as a linear beam;
    a moving shield configured to linearly block the linear beam; and
    a lens positioned at an opposite side of the filter in relation to the moving shield,
    wherein a blinking area of the lens is changed according to an area of the moving shield which blocks the linear beam, and
    wherein the moving shield includes a slider that linearly slides, a rotating plate driving the slider in a horizontal direction, and a spring elastically returning the slider.

15. The sequential turn signal using a laser source of claim 14, wherein a driven gear portion is horizontally formed at one side of the slider, the driven gear portion meshing with a gear portion having teeth formed at the rotating plate to rotate the rotating plate so that the slider moves in the horizontal direction.

16. The sequential turn signal using a laser source of claim 15, wherein the teeth of the gear portion of the rotating plate are formed only in an area corresponding to 180 degrees of a circumferential edge of the rotating plate.

17. The sequential turn signal using a laser source of claim 14, wherein, when the linear beam is blocked, the laser diode is turned off.

* * * * *